(12) United States Patent
Kim

(10) Patent No.: US 8,175,572 B2
(45) Date of Patent: May 8, 2012

(54) URGENT CALL MISAPPROPRIATION PREVENTION SYSTEM AND METHOD USING WIRELESS COMMUNICATIONS

(75) Inventor: Seong-Soo Kim, Gangnam-gu (KR)

(73) Assignee: Seo-O Telecom Co., Ltd., Seoul (KR)

( * ) Notice: Subject to any disclaimer, the term of this patent is extended or adjusted under 35 U.S.C. 154(b) by 361 days.

(21) Appl. No.: 12/525,272

(22) PCT Filed: Jan. 29, 2008

(86) PCT No.: PCT/KR2008/000534
§ 371 (c)(1),
(2), (4) Date: Jul. 30, 2009

(87) PCT Pub. No.: WO2008/093987
PCT Pub. Date: Aug. 7, 2008

(65) Prior Publication Data
US 2010/0062742 A1    Mar. 11, 2010

(30) Foreign Application Priority Data
Jan. 30, 2007   (KR) .................. 10-2007-0009463

(51) Int. Cl.
*H04M 11/04* (2006.01)
*H04W 36/00* (2009.01)
*H04B 7/00* (2006.01)

(52) U.S. Cl. .................. 455/404.1; 455/521; 455/404.2; 455/437; 379/37; 379/45; 379/48; 379/49

(58) Field of Classification Search .... 455/404.1–404.2, 455/437, 521, 408, 456.5; 340/7.2; 379/37, 379/45, 48, 49
See application file for complete search history.

(56) References Cited

U.S. PATENT DOCUMENTS

| 7,167,721 | B2 | 1/2007 | Jung |
| 7,554,439 | B2* | 6/2009 | Mehaffey ............... 340/539.18 |
| 2002/0054670 | A1 | 5/2002 | Shtivelman |
| 2002/0086659 | A1* | 7/2002 | Lauper ....................... 455/404 |
| 2002/0098844 | A1* | 7/2002 | Friedenfelds et al. ........ 455/445 |
| 2002/0173328 | A1* | 11/2002 | Min ............................ 455/521 |
| 2003/0231115 | A1* | 12/2003 | Stanners et al. ............. 340/574 |
| 2005/0085257 | A1* | 4/2005 | Laird et al. ............... 455/550.1 |
| 2005/0197096 | A1* | 9/2005 | Yang et al. ................ 455/404.1 |
| 2006/0033615 | A1* | 2/2006 | Nou ......................... 340/539.13 |

(Continued)

FOREIGN PATENT DOCUMENTS
KR  10-2001-0001455  1/2001
KR  10-2006-0027885  3/2006

*Primary Examiner* — Marivelisse Santiago Cordero
*Assistant Examiner* — Mong-Thuy Tran
(74) *Attorney, Agent, or Firm* — Sherr & Vaughn, PLLC

(57) ABSTRACT

The system includes a rescue requester device including an urgent rescue key for a requester's urgent situation, a communication company server configured to receive an urgent situation from the rescue requester device and establish a call between the rescue requester device and a rescuer device, and when the urgent situation is transferred from the rescuer device to a security server, switch the call to a call between the rescue requester device and the security server and transmits a telephone number of the rescue requester and short message information to the rescuer device, a rescuer device configured to inform the urgent situation based on the telephone number of the rescue requester device and the short message information, and a security server configured to connect the rescue requester device and a secondary emergency contact point one-sidedly through the communication company server.

5 Claims, 5 Drawing Sheets

U.S. PATENT DOCUMENTS

| | | | |
|---|---|---|---|
| 2006/0133582 A1* | 6/2006 | McCulloch | 379/45 |
| 2006/0227942 A1* | 10/2006 | Binning | 379/45 |
| 2006/0258376 A1 | 11/2006 | Ewell, Jr. | |
| 2007/0136462 A1* | 6/2007 | Nicholas, III | 709/224 |
| 2007/0159309 A1* | 7/2007 | Ito et al. | 340/425.5 |
| 2007/0171892 A1* | 7/2007 | Chang et al. | 370/352 |
| 2007/0201376 A1* | 8/2007 | Marshall-Wilson | 370/252 |
| 2007/0263780 A1* | 11/2007 | Lentini | 379/37 |
| 2008/0013523 A1* | 1/2008 | Nambakkam | 370/352 |
| 2008/0178251 A1* | 7/2008 | Shin | 725/141 |

* cited by examiner

URGENT CALL MISAPPROPRIATION PREVENTION SYSTEM AND METHOD USING WIRELESS COMMUNICATIONS

CROSS REFERENCE TO PRIOR APPLICATIONS

The present application is a National Stage Application of PCT International Application No. PCT/KR2008/000534 (filed on Jan. 29, 2008), under 35 U.S.C. 371, which claims priority to Korean Patent Application No. 10-2007-0009463 (filed on Jan. 30, 2007), which are hereby incorporated by reference in their entirety.

TECHNICAL FIELD

The present invention relates to a system and method for preventing misuse and abuse of an urgent call using a mobile communication network, and more particularly, to a system and method for preventing misuse and abuse of an urgent call using a mobile communication network, which can reduce damage due to misuse and abuse of urgent signals, which are transmitted for purposes other than urgent situations in the event that, when the emergency situations occur in a mobile communication subscriber, urgent information is transmitted through a mobile communication network.

BACKGROUND ART

In recent years, mobile communication devices have been recognized as most popularized necessities due to an explosive increase of mobile communication subscribers. Thus, mobile communication device manufacturers release mobile communication devices with a better performance and a multi-function in the market. In line with this trend, communication service providers provide a higher level communication services and several supplementary services.

There has recently been developed a technology for locating the position of a user by tracking the originating place of a mobile communication device. Thus, there have been released mobile communication devices and mobile communication services, which have a SOS function of enabling a user's mobile communication device to automatically send a call for help to judiciary bodies, such as emergency institutes and police stations, when an urgent situation occurs in the user.

However, as these technical contents are disclosed to the public, a criminal takes and breaks a user's device before or after the user sends an urgent signal in an actual situation, so further rescue signals are not sent.

Thus, although the police have noticed the user's emergency situation, the user's accurate position cannot be tracked. Further, even if the user's position has been tracked, the police arrive at the spot after the situation is finished.

In preparation for this situation, there has been attempted an urgent call processing method in which, when a mobile communication subscriber cannot perform a voice call directly, urgent information is sent to emergency contact points only through manipulation of a button in order to inform the situation of an accident spot. However, there was a problem in that emergency situations were erroneously sent due to erroneous manipulation of mobile communication devices.

Further, if an urgent signal received from a counterpart is not recognized when an urgent situation occurs in a mobile communication subscriber, nothing help cannot be given to a user who wants help. Accordingly, there was a problem in that reliability of the service is low.

DISCLOSURE OF INVENTION

Technical Problem

Accordingly, the present invention has been made in view of the above problems occurring in the prior art, and an object of the present invention is to provide a system and method for preventing misuse and abuse of an urgent call using a mobile communication network, in which when a mobile communication device's user sends an urgent call, a communication company server generates an accident receipt number, informs a previously designated primary emergency contact point (family, friends) or a secondary emergency contact point (police, fire station) of the urgent call, wherein the primary emergency contact point first receives the urgent call, solves the situation itself when the situation is determined to be a slight accident (when feeling dangers from surroundings such as incognito by a suspicious person) and, when the situation is determined to be a barbarous criminal, such as kidnapping or burglary and requires the police's help, transfers the urgent call to the secondary emergency contact point (police, fire station) in order to request a rescue so that the user can communicate with the police (call access).

Another object of the present invention is to provide a system and method for preventing misuse and abuse of an urgent call using a mobile communication network, in which a telephone number of a rescue requester, and a receipt number and positional information assigned by a mobile communication company are sent to a previously designated rescuer device, a corresponding rescuer device is controlled to generate a previously stored ring tone or a previously stored alarm, and a telephone number of a rescue requester and a telephone number or identification of a messenger (a primary emergency contact point) are displayed on a secondary emergency contact point situation room or a communication device display window.

Technical Solution

To achieve the above objects, A system for preventing misappropriation of an urgent call through a mobile communication network according to the present invention includes a rescue requester device 100 in which an urgent rescue key 110 for a requester's urgent situation is formed; a communication company server 200, which receives information about an urgent situation from the rescue requester device and establishes a call connection between the rescue requester device and a rescuer device, and when the urgent situation information is transferred from the rescuer device to a security server, switches the call connection to a call connection between the rescue requester device and the security server and transmits a telephone number of the rescue requester and short message information to the rescuer device; a rescuer device 400 that informs the urgent situation based on the telephone number of the rescue requester device and the short message information, which are received from the communication company server; and a security server 500 that connects the rescue requester device and a secondary emergency contact point (police station, fire station) in a one-direction reception state through the communication company server so that the secondary emergency contact point communicates with the rescue requester device.

A method of preventing misappropriation of an urgent call through a mobile communication network according to the present invention includes: (a) a step (S102) of allowing a communication company server to maintain a standby state; (b) a step (S103) of determining whether an urgent signal from a rescue requester device is received; (c) a step (S105) of, if, as a result of the determination in the step (d), the urgent signal from the rescue requester device has been received, searching a telephone number of a rescuer device and short message information; (d) a step (S110) of allowing the communication company server to transmit the urgent signal to the rescuer device; (e) a step (S123) of allowing the communication company server to transfer the urgent information, which is received from the rescue requester device, from the rescuer device to a security server; and (f) a step (S125) of switching a call connection between the rescue requester device and the rescuer device to a call connection between the rescue requester device and the security server.

Advantageous Effects

In accordance with the present invention of the above construction, when an urgent situation occurs in a rescue requester device's user, corresponding information is sent to a pertinent rescuer device so that the emergency situation can be notified accurately. Accordingly, there is an advantage in that a helper who encounters a dangerous situation can be rescued rapidly.

Further, according to the present invention, when a telephone number and positional information of a rescue requester or a short message, including a receipt number, etc., which indicates the recipient of an accident and is assigned by a communication company server, is sent to a previously designated rescuer device, a pertinent rescuer device is actuated to generate a previously stored ring tone or a previously stored alarm signal and rapidly inform the rescuer of the requester's emergency situation.

Further, according to the present invention, when a user recognizes danger from surroundings and sends an urgent call signal, a communication company server assigns an accident receipt number to the received urgent call, sends a short message, including a telephone number of the rescue requester and the receipt number of an accident, to a rescue device of a primary emergency contact point (family, friends) or sends a short message, including a telephone number of the rescue requester, the accident receipt number, a telephone number of a messenger and identification (parents, friends), to a secondary emergency contact point (police, fire station) when the emergency situation is a barbarous crime. Accordingly, there are advantages in that overload of a police business and misuse and abuse can be prevented and expenses caused by erroneous transmission can be saved.

BRIEF DESCRIPTION OF THE DRAWINGS

Further objects and advantages of the invention can be more fully understood from the following detailed description taken in conjunction with the accompanying drawings in which.

Figure 1:
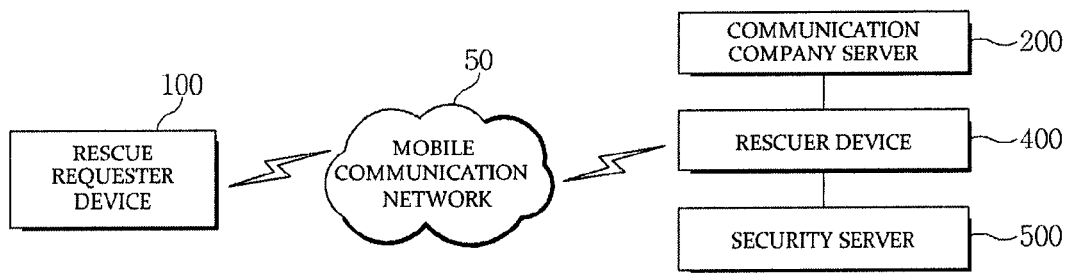
FIG. 1 is a view illustrating the construction of A system for preventing misappropriation of an urgent call according to the present invention.

EXPLANATION ON REFERENCE NUMERALS
OF MAIN ELEMENTS IN THE DRAWINGS

| 100: rescue requester device | 200: communication company server |
| 400: rescuer device | 500: security server |

BEST MODE FOR CARRYING OUT THE
INVENTION

To achieve the above objects, A system for preventing misappropriation of an urgent call through a mobile communication network according to the present invention includes a rescue requester device 100 in which an urgent rescue key 110 for a requester's urgent situation is formed; a communication company server 200, which receives information about an urgent situation from the rescue requester device and establishes a call connection between the rescue requester device and a rescuer device, and when the urgent situation information is transferred from the rescuer device to a security server, switches the call connection to a call connection between the rescue requester device and the security server and transmits a telephone number of the rescue requester and short message information to the rescuer device; a rescuer device 400 that informs the urgent situation based on the telephone number of the rescue requester device and the short message information, which are received from the communication company server; and a security server 500 that connects the rescue requester device and a secondary emergency contact point (police station, fire station) in a one-direction reception state through the communication company server so that the secondary emergency contact point communicates with the rescue requester device.

A method of preventing misappropriation of an urgent call through a mobile communication network according to the present invention includes: (a) a step (S102) of allowing a communication company server to maintain a standby state; (b) a step (S103) of determining whether an urgent signal from a rescue requester device is received; (c) a step (S105) of, if, as a result of the determination in the step (d), the urgent signal from the rescue requester device has been received, searching a telephone number of a rescuer device and short message information; (d) a step (S110) of allowing the communication company server to transmit the urgent signal to the rescuer device; (e) a step (S123) of allowing the communication company server to transfer the urgent information, which is received from the rescue requester device, from the rescuer device to a security server; and (f) a step (S125) of switching a call connection between the rescue requester device and the rescuer device to a call connection between the rescue requester device and the security server.

The present invention will now be described in detail in connection with specific embodiments with reference to the accompanying drawings.

FIG. 1 is a view illustrating the construction of A system for preventing misappropriation of an urgent call according to the present invention.

As shown in FIG. 1, the urgent call misuse and abuse prevention system employing a mobile communication network includes a rescue requester device 100, a communication company server 200, a rescuer device 400 and a security server 500, which are connected through a mobile communication network 50.

Figure 2:
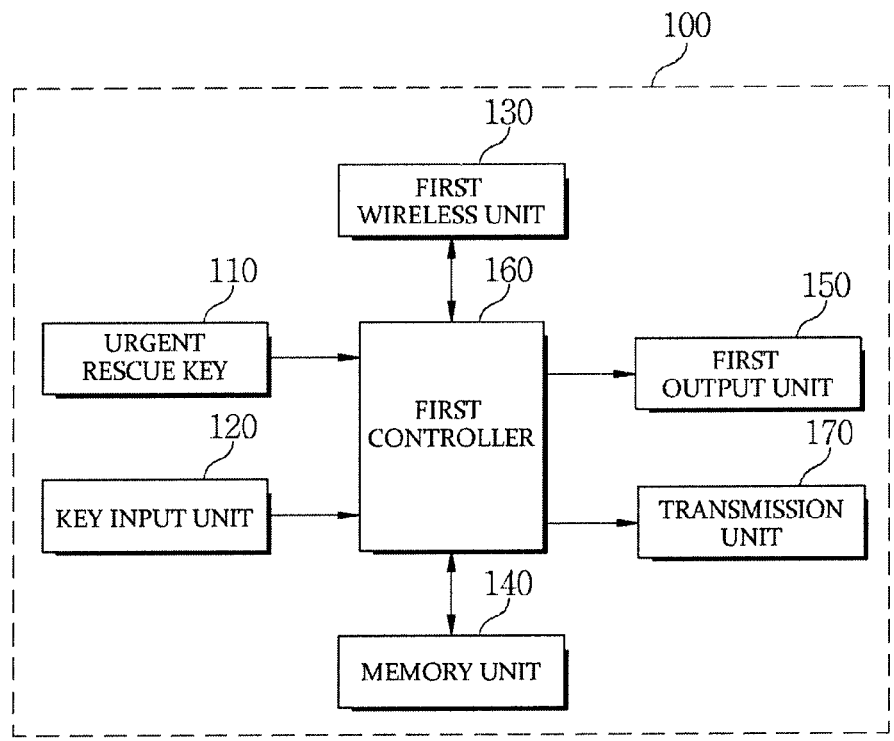
FIG. 2 is a view illustrating the construction of a rescue requester device according to the present invention.

The rescue requester device 100 is controlled by a mobile communication subscriber who encounters an urgent situation, such as a threat situation, detention by a criminal for illegal purposes, and distress in the mountain, and includes an urgent rescue key 110 for emergency (refer to FIG. 2). Thus, the rescue requester device 100 is adapted to send urgent information to a security center or a rescuer device, such as a police station or a fire station, wirelessly through a simple manipulation of the urgent rescue key 110.

Here, in the rescue requester device 100 is previously stored an emergency contact point to which an urgent signal is sent in case of emergency.

Further, the rescue requester device 100 that may be used by the handicapped, lonely seniors, etc. can be set to directly send a rescue request signal to a security server (such as a police or fire station situation room), that is, a secondary emergency contact point.

Further, when an urgent signal is sent to a rescuer device or a security server, the rescue requester device 100 can be set to enable communication or preclude receiving sound or a ring tone by the rescuer device or the security server one-sidedly.

The mobile communication network 50 includes a mobile communication relay station, a mobile communication controller, a mobile communication exchanger, and so on.

The mobile communication relay station is adapted to relay each mobile communication base station and the mobile communication controller. The mobile communication controller is adapted to perform a matching function of the mobile communication base station through the mobile communication relay station, a handoff process between respective base station cells, and call access control.

The communication company server 200 is set to communicate with the rescue requester device, which becomes a receiving state according to a call attempt by the rescuer device 400 when an urgent signal is received from the rescue requester device 100 through the mobile communication network 50.

Here, when the rescuer device 400 transfers an urgent signal, received from the rescue requester device, to the security server, a call connection between the rescue requester device and the security server is automatically switched.

The communication company server 200 configures urgent signal information received from the rescue requester device as a short message and sends the short message to the rescuer device.

The communication company server 200 generates a receipt number according to an urgent situation and sends a telephone number of a rescue requester, a receipt number to certify an urgent situation, and a short message to the rescuer device through the rescue requester device.

The communication company server 200 is described later on with reference to FIG. 3.

The rescuer device 400 is a device corresponding to the rescue requester device. If an urgent signal is received from the rescue requester device, a corresponding urgent signal is sent to a pertinent device. A number of rescuer devices can be connected to a rescue requester device.

Here, when an urgent signal is received from the rescue requester device, the rescuer device 400 can be adapted to control the volume of its speaker in order to increase the sound volume of a speaker to the maximum, determine whether a mode is a vibration mode or a ring tone mode and switch to the ring tone mode or the vibration mode, and inform a corresponding guidance comment to the rescuer.

The rescuer device 400 is described in detail later on with reference to FIG. 4.

The security server 500 receives information about an urgent situation that has not been solved from the rescuer device (the primary emergency contact point) and is connected to a police station situation room, a fire station and/or the like.

The security server 500 receives an urgent information signal, including a telephone number of a rescue requester device, messenger identification of the rescuer device, a receipt number of an accident, etc., from the rescuer device, and knows the situation of the rescue requester device since a call between the rescue requester device and the rescuer device is switched to a call between the rescue requester device and the security server.

In other words, the emergency rescue request information is sent to the security server 500 in case of emergency situations, such as kidnapping or burglary, which have not been solved in the rescuer device, that is, the primary emergency contact point. Thus, the security server 500 receives information that has been filtered by the rescuer device primarily in order to prevent overload of a police work.

Here, the security server 500 establishes a call connection to the rescue requester device 100 that has requested an emergency rescue through the communication company server. At this time, the call connection between the rescue requester device and the rescuer device is finished.

FIG. 2 is a view illustrating the construction of the rescue requester device according to the present invention.

As shown in FIG. 2, the rescue requester device 100 includes an urgent rescue key 110, which communicates with the outside wirelessly and receives an input signal from the requester when the urgent situation occurs, and is disposed outside the rescue requester device, a memory unit 140 that stores a telephone number of the rescuer device to which the urgent situation will be sent when the urgent rescue key is pressed and short message information, a first output unit 150 that outputs the urgent situation, which is generated through the urgent rescue key, to the telephone number of the rescuer device, a transmission unit 170 which activates a voice or video transmission signal when the input signal is received from the urgent rescue key and transfers surrounding voice or video to the rescuer device or the security server, and a first controller 160 which controls the overall operation of the respective constituent elements and, when the urgent rescue key is pressed by the requester in case of emergency, controls a corresponding signal to be transmitted to the communication company server 200 through a first wireless unit 130.

The urgent rescue key 110 is disposed outside the rescue requester device, in particular, at a place where the urgent rescue key 110 can be pressed by a user easily in case of emergency.

A key input unit 120 has a key control button type constructed in a common device and is used to input a police station telephone number, a telephone number of a rescuer device, a short message, and so on, which will be previously input.

The first wireless unit 130 is configured to communicate with the outside wirelessly.

The memory unit 140 stores a telephone number of a rescuer device to which an urgent signal will be sent when a rescue requester encounters a danger, and short message information.

The short message information can be stored in the rescue requester device, as described above, or in the communication company server.

When urgent rescue key information is received, the first output unit 150 sends corresponding information to the communication company server.

Further, when the urgent rescue key information is received, the first output unit 150 outputs urgent information in the form of vibration so that a rescue requester is informed of the urgent information when the urgent information is sent to the rescuer device.

When an input signal is received from the urgent rescue key, the transmission unit 170 has its microphone voice and video activated and transfers surrounding situations to the rescuer device or the security server.

The first controller 160 performs an overall control operation of the rescue requester device 100. When information according to the urgent rescue key 110 is received from a user in case of emergency according to an embodiment of the present invention, the first controller 160 controls an operation necessary to send a corresponding signal to the communication company server 200 through the first wireless unit 130.

Further, when an urgent signal is sent to the rescuer device or the security server or when a call connection is established by the rescuer device or the security server one-sidedly, the first controller 160 precludes a receiving sound or a ring tone.

Figure 3:
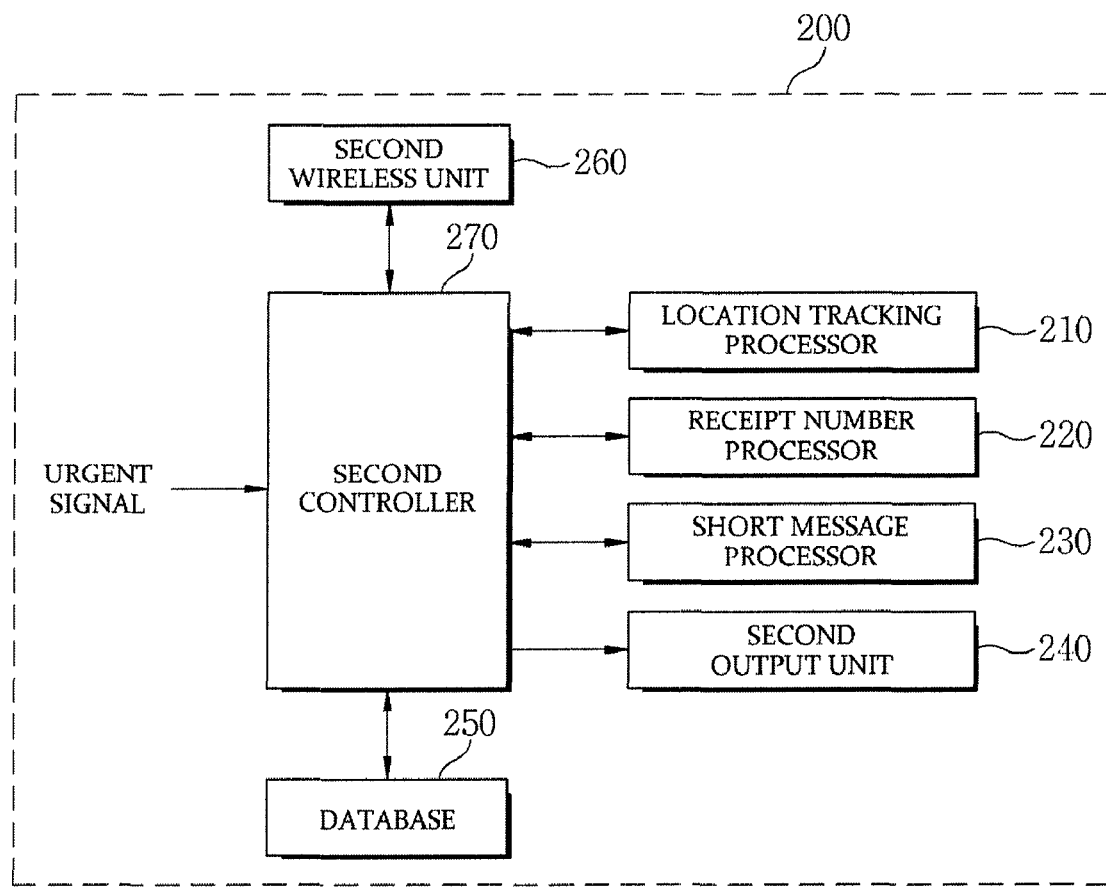
FIG. 3 is a view illustrating the construction of a communication company server according to the present invention.

FIG. 3 is a view illustrating the construction of the communication company server according to the present invention.

As shown in FIG. 3, the communication company server according to the present invention includes a location tracking processor 210 which tracks a location of the rescue requester device that has transmitted the urgent information when the urgent signal is received from the rescue requester device, a receipt number processor 220 that manages the location of the rescue requester device or the urgent signal receipt number, a short message processor 230 that transmits the urgent signal to the rescuer device, a second output unit 240 that outputs information, which is received from the short message processor and the receipt number processor, to the rescuer device, a database 250 that stores the receipt number, the positional information, the short message information, the telephone number of the rescuer, etc., and a second controller 270 which controls the overall operation of the respective constituent elements of the communication company server and controls an urgent signal, which is received from the rescue requester device, to be transmitted to the rescuer device through a second wireless unit 260 in the form of a short message.

The location tracking processor 210 tracks the location of the rescue requester device that has transmitted urgent information.

Here, the location tracking processor 210 can obtain the location of the rescue requester device through a GPS receiver or calculate the location of the rescue requester device based on information about base stations of the rescue requester device.

Further, the location tracking processor 210 tracks the location of the rescue requester device 100 that has transmitted urgent information, processes positional information according to the location tracking, and sends processed positional information to the output unit 240.

Further, the positional information is information about a GPS receiver or a base station of a rescue requester device. A unique number is assigned to a base station where a rescue requester device is located and a number is assigned to an area accordingly.

When a signal, indicating that an urgent button has been pressed, is received from the rescue requester device, the receipt number processor 220 assigns a receipt number, informing an urgent situation, to the signal and processes a receipt number of the rescue requester device, which is input through the location tracking processor 210.

The receipt number has a form 2007-3456-XXXX. In this receipt number, a date and a telephone number of a rescue requester device are connected to an emergency contact point, which makes it impossible to modify or delete the receipt number.

The short message processor 230 writes a guidance comment for sending a short message to a rescuer device. The short message is an output message according to urgent information input from the rescue requester device.

The short message processor 230 sends a message, reading "This is an urgent situation. Help me. Telephone number *- receipt number *-****, location confirmed, transfer, release, connection to a situation room, to the output unit 240.

Further, the short message information may further include a location where an urgent rescue is requested, the type of an urgent dispatch service, time occurred, command, a requester's telephone number, and so on.

The second output unit 240 outputs signals of the short message processor and the receipt number processor to a rescuer device.

The database 250 stores the receipt number information, the positional information, the short message information and the rescuer telephone number.

The second controller 270 controls the overall operation of the respective constituent elements and controls urgent signal information, which is received from the rescue requester device, to be sent a rescuer device in the form of a short message.

The second controller 270 also establishes a call connection in order to enable a call by the rescuer device or the security server one-sidedly when an urgent signal is sent to the rescuer device or the security server.

Figure 4:
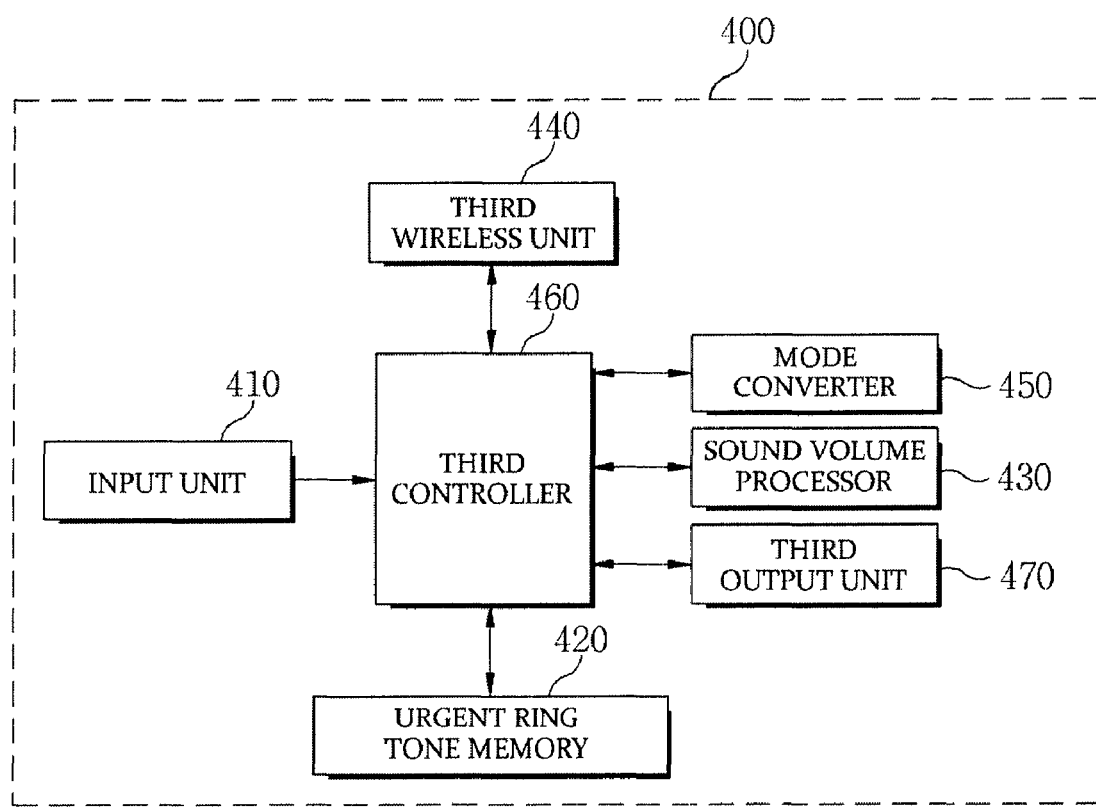
FIG. 4 is a view illustrating the construction of a rescuer device according to the present invention.

FIG. 4 is a view illustrating the construction of the rescuer device according to the present invention.

As shown in FIG. 4, the rescuer device includes an input unit 410 which communicates with the outside through a third wireless unit 440 wirelessly and receives an urgent signal from the rescue requester device, a sound volume processor 430 which converts urgent signal information, which is received through the input unit, into an urgent ring tone and outputs a converted ring tone, urgent ring tone memory 420 in which urgent ring tone data, which is alarmed in case of emergency, is stored, a mode converter 450 that determines whether an urgent signal received from the rescue requester device is a vibration mode or a ring tone mode, a third output unit 470 that outputs a mark, indicating a point where an accident has occurred in the rescue requester device when the urgent signal is input, and a third controller 460 which outputs an urgent ring tone when an urgent ring tone output request signal is generated according to the input of the urgent rescue key, controls the sound volume of a speaker to increase to the maximum, and controls the urgent signal to be transmitted to the security server when the urgent signal indicates a state where an urgent situation has not been finished.

The input unit 410 communicates with the outside wirelessly and receives an urgent signal through the communication company server.

The urgent ring tone memory 420 stores urgent ring tone data, which is output in the form of a ring tone when short message information is input through the input unit.

The third output unit 470 outputs information about a place where an accident has occurred in the rescue requester device when an urgent signal from a rescue requester device is received.

The third output unit 470 outputs "Help me. Help requester's telephone number: *--, messenger no. *-**-**, relation information with the messenger" on an output screen of the security server.

The above construction lists constituent elements necessary to construct the urgent call misuse and abuse prevention system employing a mobile communication network. Other constituent elements may be added to the above constituent elements depending on a user purpose, etc. However, parts unnecessary for the present invention are omitted.

A method employing the urgent call misuse and abuse prevention system employing a mobile communication network according to the present invention is described below with reference to FIG. 5.

Figure 5:
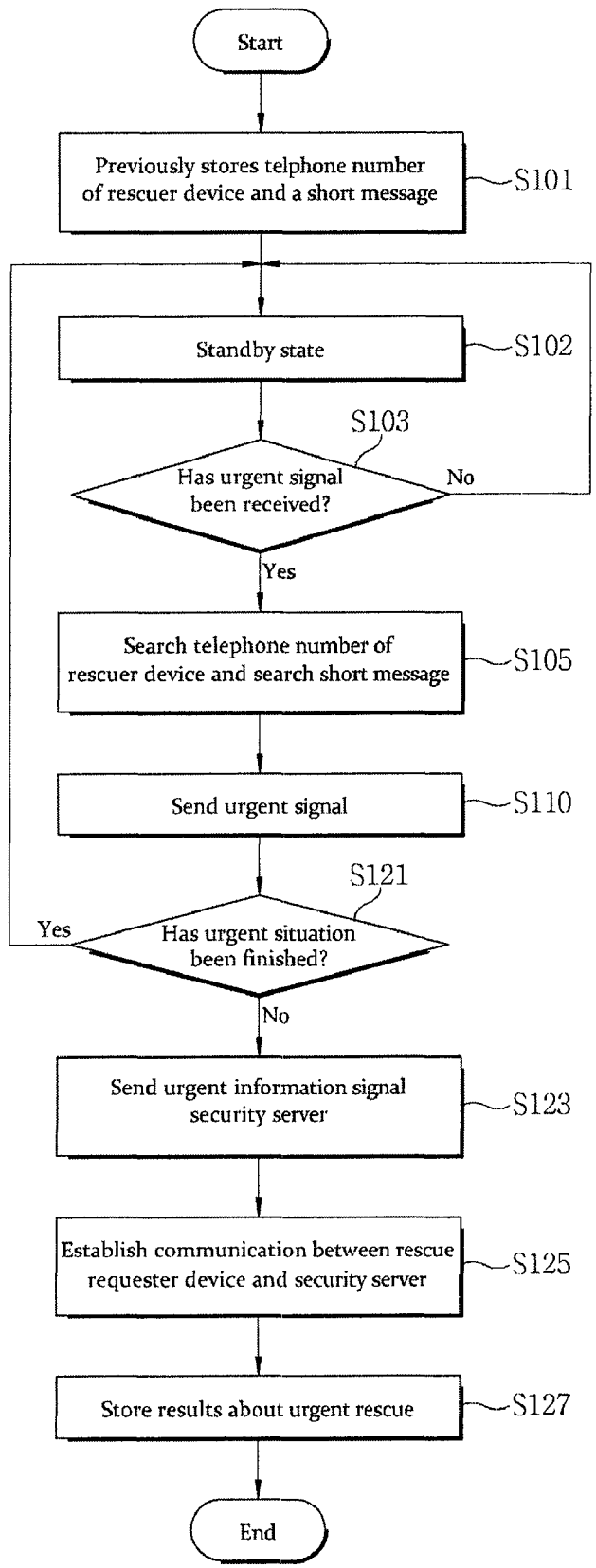
FIG. 5 is a flowchart illustrating A method of preventing misappropriation of an urgent call employing a mobile communication network according to the present invention.

FIG. 5 is a flowchart illustrating the urgent call misuse and abuse prevention method employing a mobile communication network according to the present invention.

Referring to FIG. 5, the communication company server previously stores a telephone number of a rescuer device (that is, a primary device) to which an urgent signal from a rescue requester device will be sent, and a short message (S101).

The number of the telephone number of the rescuer device in step S101 may be one or plural.

Further, in the short message storage step, the short message can be stored in the communication company server so that the rescue requester device can send the short message to the output unit of the rescuer device when an urgent situation occurs, or can be stored in the rescue requester device.

For example, a comment, reading "This is an urgent situation. Help me", can be stored. The comment can be changed by a user.

The communication company server maintains a standby state (S102)

The communication company server determines whether the urgent signal from the rescue requester device has been received (S103).

If, as a result of the determination in step S103, the urgent signal from the rescue requester device has been received, the communication company server searches the telephone number of a rescuer device and searches short message information (S105). If, as a result of the determination in step S103, the urgent signal has not been received from the rescue requester device, the communication company server continuously maintains a standby state (S102).

The communication company server sends an urgent signal to the rescuer device (S110).

Here, the short message sent to the rescuer device includes previously stored contents to inform an urgent situation of a user and positional information of the rescue requester device.

The step S110 is described in more detail with reference to FIG. 6.

The communication company server determines whether an urgent situation finish signal has been received from the rescuer device (S121).

If, as a result of the determination in step S121, the urgent situation finish signal has been received, the communication company server returns to the standby state (S101). If, as a result of the determination in step S121, the urgent situation finish signal has not been received, the communication company server sends the urgent information from the rescuer device to the security server (S123).

In the step (S123), when the urgent information is determined to be a barbarous crime by the rescuer device's user, the telephone number of the rescue requester device is sent to the security server, such as a police station, in the form of a short message under the control of the rescuer device.

The short message can be output, for example, "This is an urgent situation. Help me. Telephone number *****, Receipt number *-** messenger No. 0-**-**, and so on.

Communication between the rescue requester device and the security server is established (S125).

In the step (S125), the rescue requester device that has requested an urgent rescue keeps connected to the security server such as a police station, so the location of the rescue requester device can be confirmed in real-time.

Here, a telephone call between the rescue requester device and the rescuer device is switched to a call between the rescue requester device and the security server, so that communication between the rescue requester device and the rescuer device is finished.

The communication company server stores the results about the urgent rescue, which are received from the security server (S127).

In the step (S127), when a signal, indicating that an urgent rescue service has been finished, is transmitted from the security server to the communication company server, an urgent rescue service result is stored and a current situation is sent to the rescuer device.

Report situations include a spot situation, provided services and the like.

Figure 6:
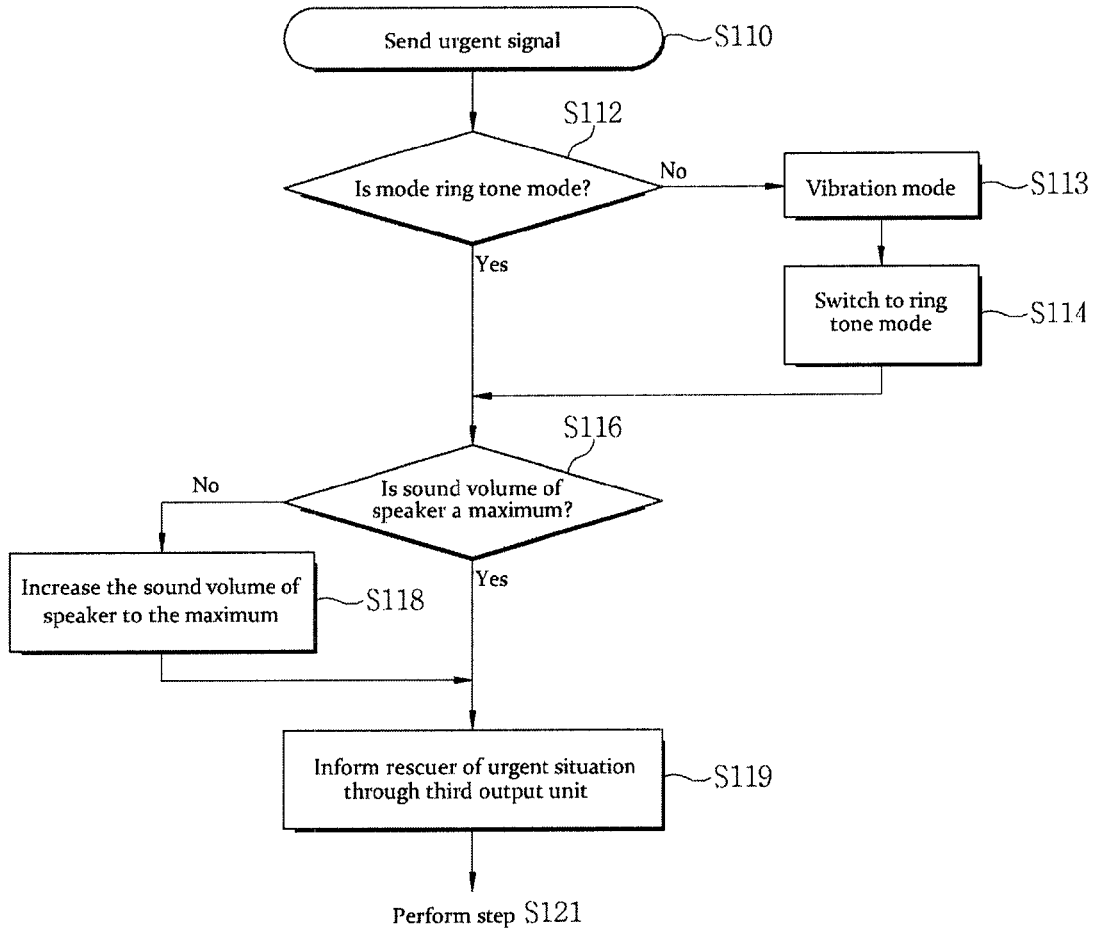
FIG. 6 is a flowchart illustrating a subroutine of an urgent signal transmission step according to the present invention.

FIG. 6 is a flowchart illustrating a subroutine of the urgent signal transmission step according to the present invention.

Referring to FIG. 6, when an urgent signal is received by the rescuer device (S110), the third controller of the rescuer device determines whether the mode is a ring tone mode (S112).

If, as a result of the determination in step S112, the mode is not the ring tone mode, the third controller determines the mode to be a vibration mode (S113). The third controller switches the vibration mode to the ring tone mode through the mode converter (S114).

If, as a result of the determination in step S112, the mode is the ring tone mode, the third controller determines whether the sound volume of the speaker is a maximum through the sound volume processor (S116). If, as a result of the determination in step S116, the sound volume of the speaker is a maximum, the third controller informs a rescuer of the urgent situation through the third output unit (S119). If, as a result of the determination in step S116, the sound volume of the speaker is not a maximum, the third controller controls the volume output unit to increase the sound volume of the speaker to a maximum (S118) and then determines whether the urgent situation has been finished as shown in FIG. 5 (S121).

Although the specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for preventing misappropriation of an urgent call through a mobile communication network, the system comprising:

a rescue requester device adapted to send an urgent request signal containing urgent situation information during an occurrence of an emergency situation, the rescue requester device including a first controller which controls operation of the rescue requester device and precludes an audio signal when communication between the rescue requester device and one of a rescuer device and a security server is established when the urgent request signal is generated;

the rescuer device as a primary emergency contact point, adapted to receive the urgent request signal, the rescuer device including a second controller which outputs an urgent ring tone if an urgent ring tone output request signal is generated when the urgent request signal is received, determines a sound volume of a rescuer device speaker, controls the sound volume of the rescuer device speaker to be increased to a maximum level;

a communication company server in communication with the rescue requester device and adapted to receive the urgent request signal from the rescue requester device and transfer the urgent request signal to the rescuer device to thereby enable communication between the rescue requester device and the rescuer device, the communication company server including a third controller which controls operation of the communication company server and enables transmission of at least the urgent request signal to the rescuer device and also a communication signal to be sent from one of the rescuer device and the security server; and the security server in communication with the rescue device and adapted to receive an urgent information signal from the rescuer device to thereby enable communication between the rescue requester device and a secondary emergency contact point in a single-direction reception state through the communication company server so that the secondary emergency contact point communicates with the rescue requester device, wherein the urgent information signal includes a telephone number of the rescue requester device, messenger identification of the rescuer device and a receipt number of an accident, wherein the communication company server switches a call connection between the rescue requester device and the rescuer device to a call connection between the rescue requester device and the security server when the urgent information signal is transferred from the rescuer device to the security server.

2. The system of claim 1, wherein the second controller controls the urgent information signal to be transmitted to the security server when the urgent request signal indicates a state where the urgent situation has not been resolved.

3. A method of preventing misappropriation of an urgent call through a mobile communication network, the method comprising:

allowing a communication company server to maintain a standby state; and then determining whether an urgent request signal from a rescue requester device is received indicating a request for an urgent rescue; and then searching a telephone number of a rescuer device and short message information when the urgent request signal from the rescue requester device has been received; and then allowing the communication company server to transmit the urgent request signal to the rescuer device; and then allowing the communication company server to transfer an urgent information signal from the rescuer device to a security server, wherein the urgent information signal includes a telephone number of a rescue requester device, messenger identification of the rescuer device and a receipt number of an accident; and then switching a call connection between the rescue requester device and the rescuer device to a call connection between the rescue requester device and the security server when the urgent information signal is transferred from the rescuer device to the security server.

4. The method of claim 3, further comprising, after switching the call connection, allowing the communication company server to receive results about the urgent rescue from the security server and store the received results.

5. The method of claim 3, wherein allowing the communication company server to transmit the urgent request signal to the rescuer device comprises:

allowing a third controller to determine whether a mode is a ring tone mode when the urgent request signal is transmitted; and then allowing a mode converter to switch an audio mode to a ring tone mode when the third controller is not the ring tone mode; and then allowing the third controller to determine whether the sound volume of a rescuer device speaker is at a maximum level, and when, as a result of the determination, the sound volume of the rescuer device speaker is not at the maximum level, allowing a sound volume processor to increase the sound volume of the rescuer device speaker to the maximum level.

\* \* \* \* \*